United States Patent
Cheng et al.

(10) Patent No.: US 6,442,513 B1
(45) Date of Patent: Aug. 27, 2002

(54) COMPONENT MAPPER FOR USE IN CONNECTION WITH REAL-TIME OPTIMIZATION PROCESS

(75) Inventors: Tu Ching Cheng, Cherry Hill; Apostolos Georgiou, Voorhees; Frederick J. Krambeck, Cherry Hill, all of NJ (US)

(73) Assignee: Mobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/224,579

(22) Filed: Dec. 31, 1998

Related U.S. Application Data (60) Provisional application No. 60/097,566, filed on Aug. 24, 1998, and provisional application No. 60/097,567, filed on Aug. 24, 1998.

(51) Int. Cl.[7] ............................................... G06F 17/50
(52) U.S. Cl. ............................. 703/12; 703/2; 700/27; 700/28; 700/29
(58) Field of Search ................... 703/6, 12, 9; 700/29, 700/27, 28, 30, 31, 32, 34, 267, 108

(56) References Cited

U.S. PATENT DOCUMENTS

| | | | |
|---|---|---|---|
| 4,047,004 A | 9/1977 | Peiser ...................... | 235/151.12 |
| 4,208,712 A | 6/1980 | Deutsch ...................... | 364/105 |
| 4,211,636 A | 7/1980 | Gross et al. ................ | 208/164 |
| 4,211,637 A | 7/1980 | Gross et al. ................ | 208/164 |
| 4,282,084 A | 8/1981 | Gross et al. ................ | 208/113 |
| 5,402,333 A | 3/1995 | Cardner ...................... | 364/151 |
| 5,486,995 A * | 1/1996 | Krist et al. ................ | 364/149 |
| 5,519,603 A * | 5/1996 | Allbery, Jr. et al. ........ | 364/133 |
| 5,666,297 A | 9/1997 | Britt et al. .................. | 364/578 |
| 5,699,269 A | 12/1997 | Ashe et al. .................. | 364/499 |
| 5,699,270 A | 12/1997 | Ashe et al. .................. | 364/500 |
| 5,796,920 A * | 8/1998 | Hyland ........................ | 395/22 |
| 5,864,773 A * | 1/1999 | Barna et al. .................. | 702/85 |
| 6,038,540 A * | 3/2000 | Krist et al. .................. | 705/8 |

OTHER PUBLICATIONS

Bartusiak, R.D. et al., "Realtime Optimization at the Fife Ethylene Plant", American Institute of Chemical Engineers Spring 1993 Symposium, 5th Annual Ethylene Producers Conference, Houston, TX, Mar. 31, 1993, 1–14.

(List continued on next page.)

*Primary Examiner*—Kevin J. Teska
*Assistant Examiner*—T. Phan
(74) *Attorney, Agent, or Firm*—Woodcock Washburn LLP (57) ABSTRACT

A component mapper is provided in connection with a process wherein a fluid stream having multiple physical components is modeled as a plurality of pseudo-components. Each physical component has a boiling point, and each pseudo-component has a pre-defined boiling point and includes all physical components from the fluid stream having approximately the pre-defined boiling point. Each pseudo-component in the model of the fluid stream has a varying pre-defined property and a varying amount. A plurality of sub-pseudo-components are defined for each pseudo-component such that the pseudo-component is replaceable therewith. Each sub-pseudo component has the pre-defined boiling point of the pseudo-component, a pre-defined value for the pre-defined property, and a varying amount. For each pseudo-component, a current value of the pre-defined property and a current amount of the pseudo-component are obtained, and a current amount for each sub-pseudo-component of the pseudo-component is then calculated. The pre-defined value of the pre-defined property and the calculated current amount for each sub-pseudo-component of each pseudo-component are then utilized in a real-time optimization process. In one embodiment of the present invention, the pre-defined property is density, and the amount is percentage weight and percentage volume.

48 Claims, 6 Drawing Sheets

OTHER PUBLICATIONS

Besl, H. et al., "Closing the Loop: Innovations for Naphtha Complex Optimization", NPRA Computer Conference, National Petroleum Refiners Association, New Orleans, LA, , Nov. 17–19, 1997, 1–18.

Brice, P. et al., "Crude unit optimisation: Case study", *PTQ Computer Control*, Winter 1996/97, *Reader Enquiry No. 446*, 95–99.

Georgiou, A. et al., "Plant Wide Closed Loop Real Time Optimization and Advanced Control of Ethylene Plant—CLRTO Improves Plant Profitability & Operability", NPRA Computer Conference, National Petroleum Refiners Association, New Orleans, LA, , Nov. 17–19, 1997, 1–16.

Horne, W.A., "Review of German Synthetic Lubricants", *Indust. Engineer. Chem.*, 1950, 42(12), 2428–2436.

Kim, J.S. et al., "Novel Nickel(II)– and Palladium(II)–Based Catalytic Systems for the Synthesis of Hyperbranched Polymers from Ethene", *J. Am. Chem. Soc.*, 1998, 120, 1932–1933.

Kleinschrodt, III, F.J., "Industrial Vision for Process Optimization", *Computers Chem. Engng.*, 1996, 20, S473–S483.

Kuliyev, R. et al., "Production of Polyethylene Oil", ("Polucheniye polietilenovogo masla"), *NTIS*, 1986, 6, 14–15 (English translation only—4 pages).

Mahalec, V. et al., "Software Architecture for On–Line Modeling and Optimization", AIChE Spring National Meeting, Houston, TX, Mar. 28–Apr. 1, 1993, 1–25.

McCormick, R. et al., "Real–time Optimization of Fluid Catalytic Cracking and Catalytic Polymerization Units", 1996 NPRA Computer Conference, No. CC–96–128, 1996, 1–10 and 1–28 of diagrams.

Paules, IV, G.E.et al., "A Fundamental Free Radical Kinetic Pyrolysis Model for On–line, Closed–loop Plant–wide Optimization of Olefins Plants", Paper presented at CIMPRO '94, New Brunswick, NJ, Apr. 25, 1994, 1–26.

Quann, R.J. et al., "Building Useful Models of Complex Reaction Systems in Petroleum Refining", 14th International Symposium on Chemical Reaction Engineering, Brugge, Belgium, May 1996, 1–20.

Quann, R.J. et al., "Structure–Oriented Lumping: Describing the Chemistry of Complex Hydrocarbon Mixtures", *I&EC Research*, 1992, 31, 1–15.

Sapre, A. V. et al., "Core of Chemical Reaction Engineering: One Industrial View", *Ind. Eng. Chem. Res.*, 1995, 34, 2202–2225.

Van Wijk et al., "Advanced Process Control and On–Line Optimisation in Shell Refineries", *CACE*, 1990, *Suppl. G*, S69–S80.

* cited by examiner

COMPONENT MAPPER FOR USE IN CONNECTION WITH REAL-TIME OPTIMIZATION PROCESS

This application claims priority under 35USC 0119 of provisional application No. 60/097,566 and No. 60/097,583 filed Aug. 24, 1998, T.P. Jun. 26, 2002

FIELD OF THE INVENTION

The present invention relates to a component mapper for use in connection with a real-time optimization process relating to a refinery operation. More particularly, the present invention relates to such a component mapper that obtains values of model components and then calculates values of sub-components of the model components.

BACKGROUND OF THE INVENTION

As is known, in an optimization process, a system is computer modeled, and the model is optimized so as to maximize certain results and/or minimize certain results. As is known, such optimization typically involves an iterative mechanism whereby system settings are settled upon. The result of a real-time optimization of a computer model, then, is a plurality of set points that will achieve the aforementioned optimization.

Such an optimization process typically includes the steps of collecting system data and performing an optimization routine based on such collected data. If the optimization routine is concluded relatively quickly, the system likely will not have significantly changed, and the results of the optimization will likely be applicable to the system. Correspondingly, if the optimization routine is not concluded relatively quickly, the system likely will have significantly changed, and the results of the optimization will likely not be applicable to the system. For example, if the optimization routine is based on one ambient temperature and is concluded when the ambient temperature has decreased by ten degrees, it is likely that such decrease will materially affect the validity of the results of the optimization process. It is necessary, then, that the optimization routine be performed relatively quickly.

In the oil refining industry, real-time optimization processes have been employed in an effort to real-time optimize an oil refinery or a portion thereof. In a real-time optimization of an entire refinery, necessary inputs typically include pre-defined parameters that define plant economics; information on available crude oil feed stocks, and assays/analyses of such feed stocks; operating constraints on the plant, such as whether particular facilities within the plant are available; operating conditions at the plant site, including ambient temperature and air pressure as well as humidity and precipitation information; and other similar information about the overall refinery, its environment, and its operating elements. Based on such inputs, then, the goal is to optimize the performance of the entire refinery, or at least a portion thereof.

As should be understood, exactly what is being optimized may vary from day to day, or even from hour to hour. For example, during one eight-hour period, the refinery or a portion thereof may be optimized to produce gasoline. During the next four hours, the refinery or a portion thereof may be optimized to produce home heating oil. During the next 48 hours thereafter, the refinery or a portion thereof may be optimized, to produce both propane and ethylene.

As may be appreciated, however, the effort to real-time optimize an oil refinery or a portion thereof is considerable. For one thing, the models for the elements in the refinery can be quite complex, involving many variables and complex equations. For another, the amount of information that must be supplied to the optimization, and that must be exchanged between the element models, can be tremendous. Accordingly, although an entire refinery can be and has been computer modeled for purposes of a real-time optimization process, the size and complexity of the overall model of the refinery has thus far resulted in an excessive amount of computing time necessary to optimize such overall model. As a result, such optimization process is not truly 'real-time'.

Accordingly, a need exists for a true real-time optimization process in connection with optimization of an oil refinery or a portion thereof.

SUMMARY OF THE INVENTION

The present invention satisfies the aforementioned need by providing a component mapper in connection with a process wherein a fluid stream having multiple physical components is modeled as a plurality of pseudo-components. Each physical component has a boiling point, and each pseudo-component has a pre-defined boiling point and includes all physical components from the fluid stream having approximately the pre-defined boiling point. Each pseudo-component in the model of the fluid stream has a varying pre-defined property and a varying amount.

A plurality of sub-pseudo-components are defined for each pseudo-component such that the pseudo-component is replaceable with the plurality of sub-pseudo-components. Each sub-pseudo component has the pre-defined boiling point of the pseudo-component, a pre-defined value for the pre-defined property, and a varying amount.

For each pseudo-component, a current value of the pre-defined property and a current amount of the pseudo-component are obtained, and a current amount for each sub-pseudo-component of the pseudo-component is then calculated. The pre-defined value of the pre-defined property and the calculated current amount for each sub-pseudo-component of each pseudo-component are then utilized in a real-time optimization process.

In one embodiment of the present invention, the pre-defined property is density, and the amount is percentage weight and percentage volume.

BRIEF DESCRIPTION OF THE DRAWINGS

The forgoing summary as well as the following detailed description of the present invention will be better understood when read in conjunction with the appended drawings. As should be understood, however, that the invention is not limited to the precise arrangements and instrumentalities shown. In the drawings.

DETAILED DESCRIPTION OF PREFERRED EMBODIMENTS

Certain terminology may be used in the following description for convenience only and is not considered to be limiting. The words "left", "right", "upper", and "lower" designate directions in the drawings to which reference is made. The words "inwardly" and "outwardly" are further directions toward and away from, respectively, the geometric center of the referenced object. The terminology includes the words above specifically mentioned, derivatives thereof, and words of similar import.

Figure 1:
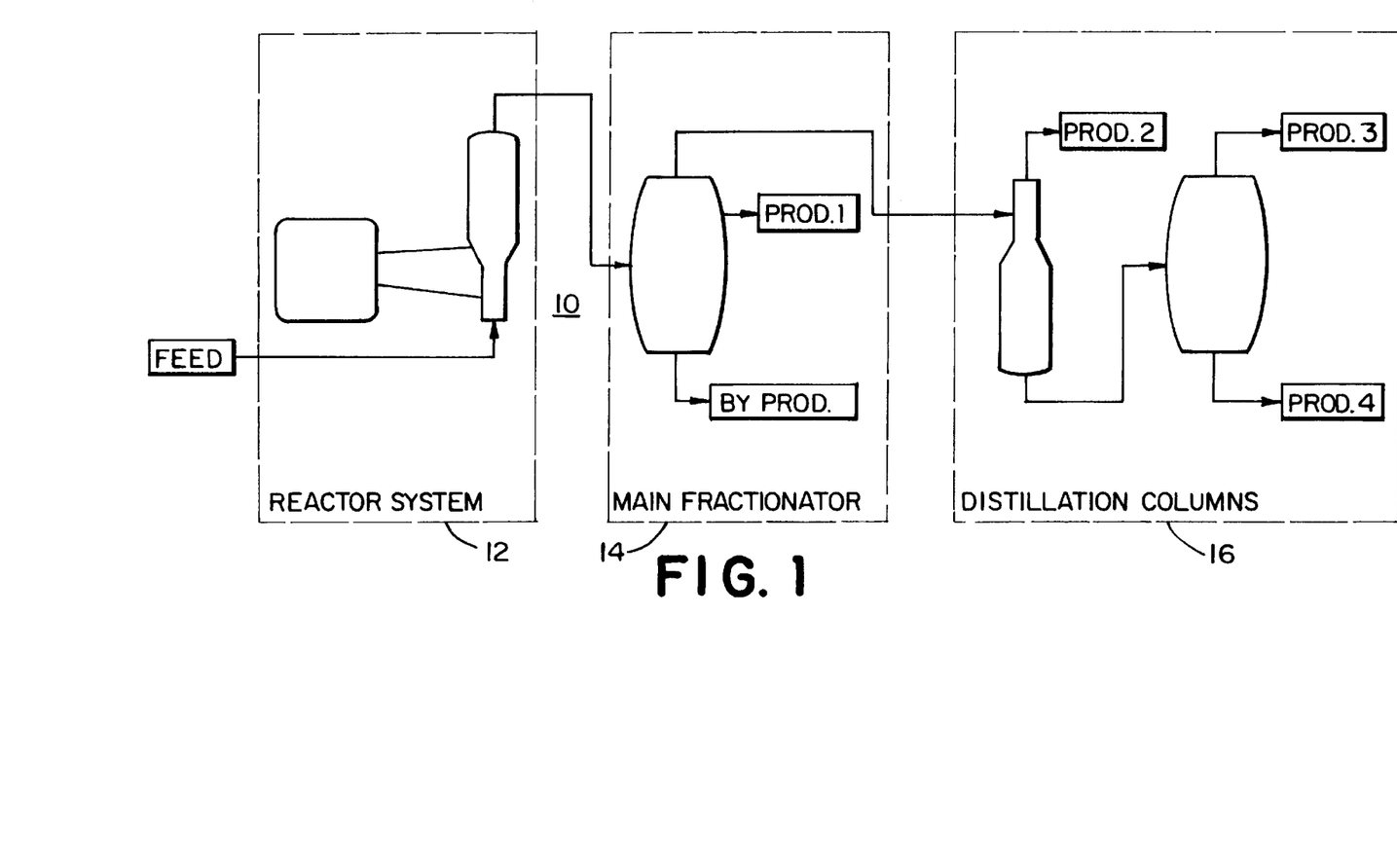
FIG. 1 is a block diagram showing a typical configuration of refinery units including a reactor system integrated with a main fractionator and one or more distillation columns.

Referring to the drawings in detail wherein like numerals are used to indicate like elements throughout, there is shown in FIG. 1 a typical configuration of a refinery system 10a, including a reactor system 12, a main fractionator 14 and a series of distillation columns 16. As is known, the refinery system 10a may represent substantially an entire refinery. However, and more likely, a typical refinery will have several refinery systems 10a as shown in FIG. 1, as well as several other different refinery systems (not shown). Nevertheless, for purposes of understanding the present invention, it is necessary to consider only the refinery system 10a shown in FIG. 1.

As is known, a typical refinery receives one or more types of crude oil as an input, and produces several different products as outputs. As is also known, crude oil in general is composed of thousands of different types of hydrocarbon-based molecules, ranging from lighter, relatively simple molecules (with relatively low boiling points) to heavier, relatively complex molecules (with relatively high boiling points). As a preliminary step, then, and as will be discussed below in connection with FIGS. 5 and 6, the crude oil is initially fractionated in a main crude unit to at least roughly separate such crude oil into several fluid streams according to the weights/boiling points of its compositional components.

However, since the lower weight/boiling point fluid streams are considered more desirable, at least some of the higher weight/boiling point fluid streams are applied as a feed to a reactor process involving the reactor 12 of FIG. 1. The reactor 12 applies temperature, pressure, and/or a catalyst to the received feed in a known manner so as to break down the physical components within the feed from more complex, heavier molecules to less complex, lighter molecules. Accordingly, the reactor 12 produces a fluid stream at an output thereof that has more lower weight/boiling point physical components as compared with the feed to such reactor 12. The fluid stream output from such reactor 12 is then forwarded to the main fractionator 14 for receipt thereby.

The main fractionator 14, as is known, is a rather large vertical column having an established temperature gradient therein. Specifically, the fractionator 14 is relatively cool at the top (on the order of ambient temperature) and relatively hot on the bottom (on the order of 1,000 to 1,200 degrees Fahrenheit or more). The physical components within the fluid stream received by the main fractionator 14, then, settle out within the main fractionator 14 according to their respective boiling points. More specifically, each physical component of the fluid stream entering the main fractionator 14 will rise and/or fall until it reaches equilibrium at its boiling point temperature within such fractionator 14. If a physical component is currently a liquid, it will fall into hotter temperatures until it reaches a zone where it will boil into a gas. Correspondingly, if such physical component is currently a gas, it will rise into cooler temperatures until it reaches a zone where it will liquefy.

The main fractionator 14 contains trays at a plurality of different heights/temperature zones (not shown) such that each tray roughly corresponds to a boiling point. Physical components within the fluid stream that have approximately such boiling point, then, are collected in such tray and output as fluid streams for further processing (PROD. 1, BY PROD. in FIG. 1). As should be understood, the main fractionator 14 performs a coarse separation of the fluid stream received from the reactor 12 into fractionated fluid streams. In order for finer separation of the fractionated fluid streams to take place, each fractionated fluid streams is forwarded from the main fractionator 14 to one or more distillation columns 16 for receipt thereby for further separation into finer components.

As is known, each distillation column 16 operates on the same functional principles as the main fractionator 14. That is to say, each distillation column 16 establishes a temperature gradient in a vertical column, from cooler on top to hotter on bottom. However, to achieve finer separation in, for example, a received fractionated fluid stream having a rough boiling point of 300 degrees Fahrenheit, one distillation column 16 may have an established temperature range from 200 to 400 degrees Fahrenheit, and have trays at 20 degree Fahrenheit intervals therein. Likewise, to achieve finer separation in, for example, received fractionated fluid streams having rough boiling points of 600 and 700 degrees Fahrenheit, another distillation column 16 may have an established temperature range from 500 to 800 degrees Fahrenheit, and have trays at 30 degree Fahrenheit intervals therein. With such finer separation from multiple ones of the distillation columns 16, multiple products may be output therefrom (PROD. 2, PROD. 3, PROD. 4 in FIG. 1).

As should be recognized, although a reactor refinery system 10a will likely contain the reactor 12, the main fractionator 14 and a series of distillation columns 16, as is shown in FIG. 1, the structure and organization of such reactor refinery system 10a may vary without departing from the spirit and scope of the present invention. For example, multiple reactors 12 may be employed, where each reactor operates at different temperatures, pressures, and/or with different catalysts. Likewise, multiple fractionators 14 may be employed and multiple distillation columns 16 may be employed, all in multiple different arrangements, both serially and in parallel. For example, multiple fractionators 14 may be fed in parallel by multiple reactors 12, and multiple serieses of distillation columns 16 may be fed in parallel by multiple fractionators 14.

Figure 2:
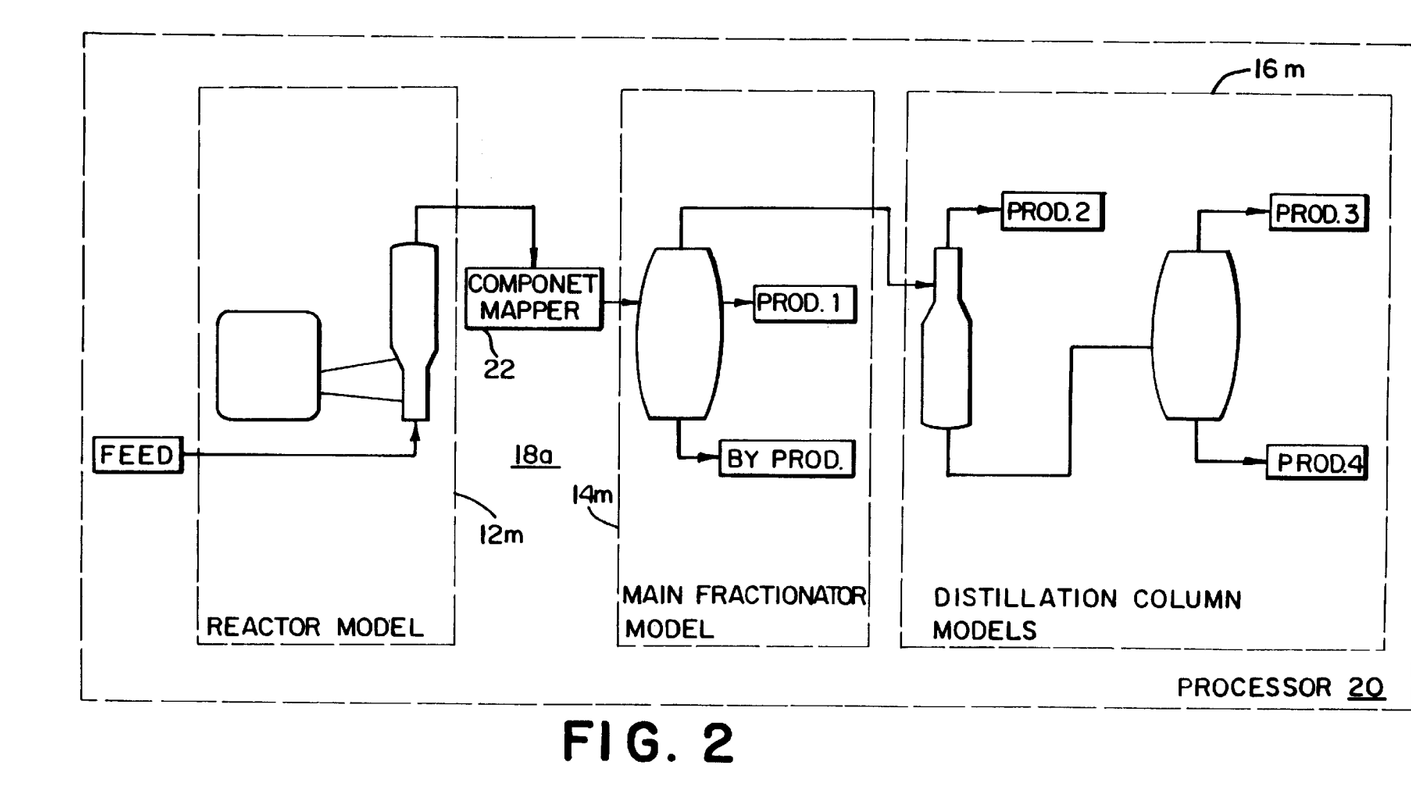
FIG. 2 is a block diagram in accordance with one embodiment of the present invention, and shows the reactor, main fractionator, and distillation columns of FIG. 1 modeled along with a component mapper.

Referring now to FIG. 2, it is seen that in performing an analysis on the reactor refinery system 10a of FIG. 1, each element as shown in FIG. 1 is replaced by and represented by a corresponding computer model 18a operating on an appropriate computer system or processor 20. The processor or computer system 20 may be any appropriate device without departing from the spirit and scope of the present invention, as long as such processor 20 has sufficient power for running the model 18a in a timely manner. For example, the processor 20 may be a personal computer or work station processor, a mini-computer processor, a main-frame computer processor, or the like.

Thus the reactor model 12m represents the reactor 12, the main fractionator model 14m represents the main fractionator 14, and the distillation column models 16m represent the distillation columns 16. Any appropriate rigorous chemical engineering materials and energy balanced models may be used for the models 12m, 14m, 16m without departing from the spirit and scope of the present invention. Such models 12m, 14m, 16m are generally known and therefore do not require any detailed discussion in the present disclosure. Suffice it to say, though, that each model 12m, 14m, 16m expects an input representative of a fluid stream or feed, and each model produces one or more outputs representing the one or more fluid streams output from the corresponding element.

As was discussed above, crude oil in general is composed of thousands of different types of hydrocarbon-based molecules. Correspondingly, in any refinery process, the fluid stream or feed received by a particular element is a complex amalgam of thousands of chemical compounds and molecules. Although each and every compound and/or molecule in a fluid stream may be individually taken into account for purposes of any one model, it has long been recognized that such a model would be far too complex and would require far too much computing time.

Instead, it has been found that by grouping compounds and molecules into pseudo-components or lumps based on boiling points, and by modeling based on such lumps, good modeling results may be obtained. This is especially true in view of the fact that much of the operation of a refinery depends on boiling points of compositional components of crude oil.

In one typical system of boiling point temperature lumps, a pseudo-component or lump 112 is defined to include all physical components that have a boiling point of approximately 112 degrees Fahrenheit, lump 130 is defined to include all physical components that have a boiling point of approximately 130 degrees Fahrenheit, etc. Such system continues with lumps in increments of 20 degrees Fahrenheit (150, 170, etc.) up to approximately 1,010 degrees Fahrenheit. However, other systems of temperature lumps are also known, and such other systems may be employed without departing from the spirit and scope of the present invention. For example, the range of the lumping system can be expanded or contracted, and the periodicity within the range can be likewise expanded or contracted. Moreover, certain ones of the lumps may be ignored, if it is deemed advisable to do so.

With the aforementioned lumping system, each input to and output from a particular model 12m, 14m, 16m may be defined according to the lumps contained therein. Moreover, it has been found that modeling with such lumps gives acceptable optimization results. Nevertheless, the time necessary to obtain such results is too long, even with advanced computers. As a rough estimate, in refinery optimization, if a computer modeling system cannot provide results within about 45 minutes, such computer modeling system cannot be fairly characterized as a real-time optimization process. Put another way, an optimization result for data obtained at time T will not be valid at time T plus 45 minutes because of the likelihood that conditions will change significantly in the intervening time.

With each element in a refinery or portion thereof being represented by its model 12m, 14m, 16m, the optimization process can take place. In such process, refining of the feed is optimized based on pre-selected optimization variables. In particular, and as is known, certain inputs and/or outputs and/or other operating parameters of the refinery system 10a are selected to be maximized or minimized, and the optimization process fine-tune such models 12m, 14m, 16m in an iterative manner until optimization is achieved (if indeed optimization is possible). The process of optimization is generally known and therefore need not be further described here in any detail.

A significant problem that has heretofore prevented realization of true real-time optimization results from the fact that the specific gravity/density of each lump as it is input into the fractionator model 14m or distillation column model 16m can vary from iteration to iteration in the optimization process. More specifically, such models 14m, 16m require a large additional amount of processing time when they receive as inputs lumps whose specific gravity/density varies from iteration to iteration. As should be understood, such variations in lump specific gravity/density occur as a result of changes in yields of the lumps as they are output from the reactor model 12m from iteration to iteration, where such changes occur with changes in temperatures, pressures, and/or catalysts used. Such changes in lump yields, as should be understood, correspond to changes in the yields from the reactor 12 of the physical components that correspond to the lumps.

The large additional amount of processing time required by variations in lump specific gravity/density in the main fractionator model 14m and the distillation column models 16m radically increase the time it takes for a real-time optimization process to reach equilibrium, to the point where such process is not in fact reasonably considered to be real-time (i.e. greater than about 45 minutes).

As should be understood, the output of the reactor model 12m is a plurality of lumps corresponding to a fluid stream, where each lump in such fluid stream has a varying density D, a varying percentage weight % W, and a varying percentage volume % V. Such values are known for each lump in such outputted fluid stream, as is the total density DT of such outputted fluid stream, and are supplied by the reactor model 12m.

As a reminder, density d of an object is determined as weight w/volume v. For any particular lump, percentage weight % W is $w_{lump}/w_{total}$, and percentage volume % V is $v_{lump}/v_{total}$. Accordingly, the density D of such lump is:

$$D = (\% W * w_{total}) / (\% V * v_{total}),$$

or $$D = (w_{total}/v_{total}) * (\% W / \% V),$$

or $$D = DT * \% W / \% V,$$

where DT is the total density of the fluid stream within which the lump resides. Since specific gravity is closely related to density in that specific gravity is density as compared with the density of water, similar calculations may be performed to show that the specific gravity SG of a lump is:

$$SG = SGT * \% W / \% V,$$

where SGT is the total specific gravity of the fluid stream within which the lump resides. Because of the close relationship between specific gravity and density, it is hereby understood that such terms are interchangeable in the present disclosure and appended claims, except in any instance where necessity or logic dictates otherwise.

In the present invention, the problem of varying lump density is solved by defining for each lump a plurality of sub-lumps, where each sub-lump has a constant density. More particularly, and as seen in FIG. 2, in the present invention, a component mapper 22 is employed to receive as an input each lump outputted from the reactor model 12, and to provide at an output a plurality of sub-pseudo-components or sub-lumps for each inputted lump such that the inputted lump is replaceable with the plurality of outputted sub-lumps. Importantly, while each inputted lump has a density that can vary from iteration to iteration, each sub-lump outputted from the component mapper 22 has a pre-defined constant density. Also importantly, each sub-lump has the pre-defined boiling point of its corresponding inputted lump. Each sub-lump has a percentage weight and a percentage volume that varies from iteration to iteration. The component mapper 22, then, determines the percentage weight and percentage volume for each sub-lump for each iteration in a manner so that: 1) the density of each sub-lump remains constant; 2) weight is conserved (the percentage weight of a lump is equal to the sum of the percentage weights of all of its sub-lumps) and 3) volume is conserved (the percentage volume of a lump is equal to the sum of the percentage volumes of all of its sub-lumps).

In defining the sub-lumps (step 401, FIG. 4A), the number of sub-lumps for each lump may vary without departing from the spirit and scope of the present invention. For example, 2, 3, 4, or even more sub-lumps may be employed for each lump. However, it does bear mentioning that each additional sub-lump will increase computing time in the model 18a. The manner in which each sub-lump is defined may likewise vary without departing from the spirit and scope of the present invention.

Figures 3, 4C:
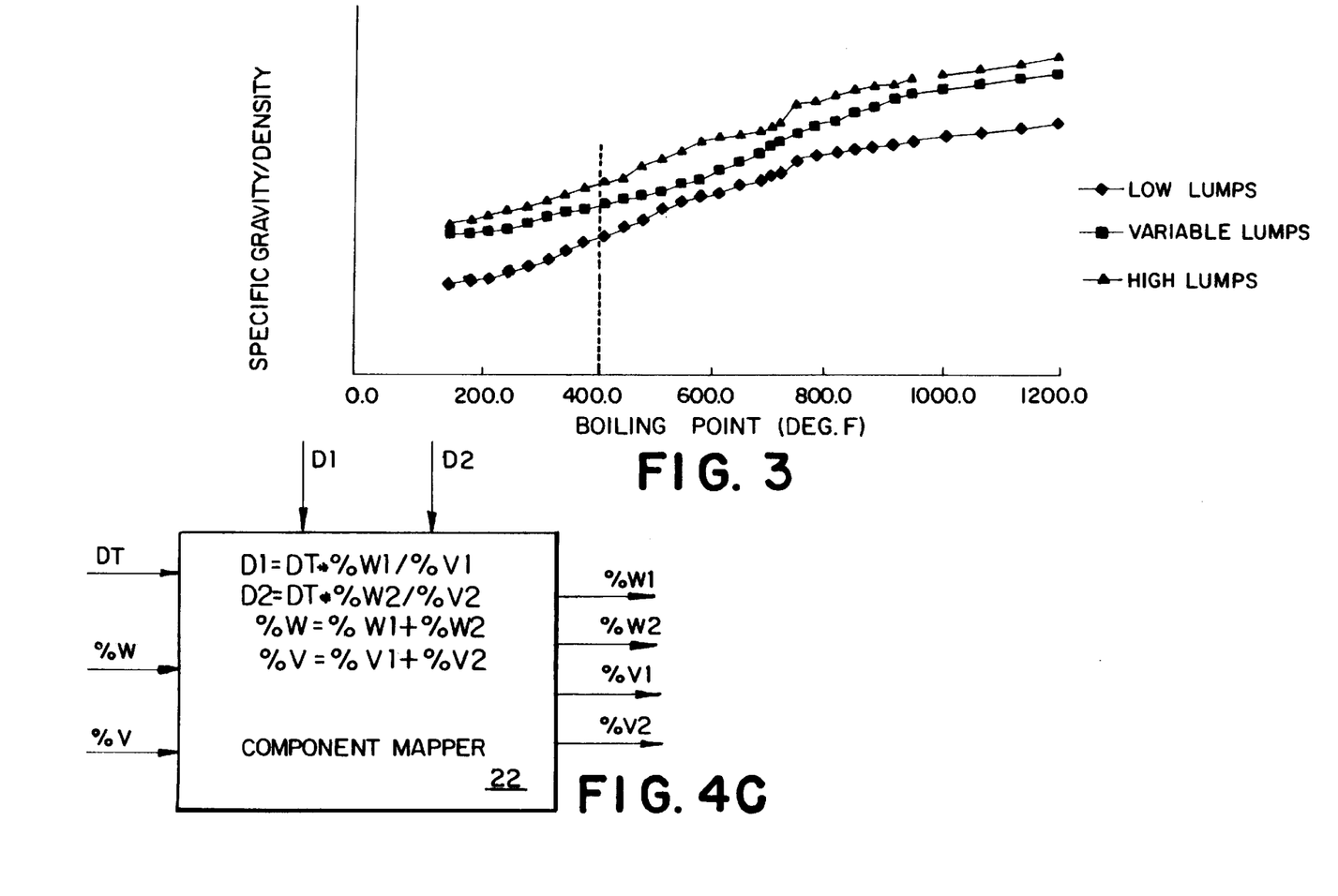
FIG. 3 is a graph showing a typical relationship between specific gravity/density and boiling point of pseudo components or lumps in a refinery fluid stream.
FIG. 4C is a block diagram showing the inputs and outputs of the component mapper of FIG. 2.

In one embodiment of the present invention, and referring now to FIG. 3, a HIGH (H) sub-lump (the triangle mark) having a relatively high pre-defined density and a LOW (L) sub-lump (the diamond mark) having a relatively low pre-defined density are defined for each lump (the square mark). As can be seen from FIG. 3, for any lump, the lump and its sub-lumps reside in a vertical line, owing to the fact that they share a common fixed boiling point.

Preferably, for each lump, the relatively high pre-defined density of the corresponding H sub-lump is determined as approximately the highest likely density that the lump can achieve, and the relatively low pre-defined density of the corresponding L sub-lump is determined as approximately the lowest likely density that the lump can achieve. Accordingly, such sub-lumps generally define the likely density range within which the lump can 'roam'.

As is known, such highest and lowest likely density information is available or can be determined. In particular, for any feed to the reactor 12/reactor model 12m, assay information is available or can be determined, and such assay information can be employed in a known manner to determine such density information. The graph shown in FIG. 3 is but one example of density information derived from assay information. Of course, the marks in the graph will vary from feed to feed.

As was discussed above, the component mapper 22 determines the percentage weight and percentage volume for each sub-lump for each iteration in a manner so that: 1) the density of each sub-lump remains constant; 2) weight is conserved; and 3) volume is conserved. Accordingly, the component mapper 22 requires as input for each lump: the percentage weight % W of such lump; and the percentage volume % V of such lump. In addition, to perform density calculations based on percentage figures, the component mapper requires as input the total density DT of the fluid stream within which the lump resides. As seen in FIG. 4B, based on the received percentage weight and percentage volume values for the lump (pseudo-component L), the component mapper 22 calculates percentage weight and percentage volume values for each of a pair of sub-lumps (sub-pseudo-components SL1 and SL2).

Referring now to FIG. 4C, the first sub-lump (i.e., one of the H or L sub-lumps) will have a (pre-defined) density D1, a (varying) percentage weight % W1, and a (varying) percentage volume % V1, where such values are related as follows:

$$D1=DT*\%\ W1/\%\ V1. \tag{1}$$

Likewise, the second sub-lump (i.e., the other of the H and L sub-lumps) will have a (pre-defined) density D2, a (varying) percentage weight % W2, and a (varying) percentage volume % V2, where such values are related as follows:

$$D2=DT*\%\ W2/\%\ V2. \tag{2}$$

Since weight and volume are each conserved, it is necessary that:

$$\%\ W=\%\ W1+\%\ W2, \tag{3}$$

and $$\%\ V=\%\ V1+\%\ V2. \tag{4}$$

D1 and D2 are pre-defined, and % W, % V, and DT are received by the component mapper 22, as seen in FIG. 4C. Accordingly, the un-known values are % W1, % W2, % V1, and % V2. Since there are four un-known values and four equations (eqs. (1)–(4)), then, the four equations can be solved to define each of the four un-known values according to known values.

Figure 4A:
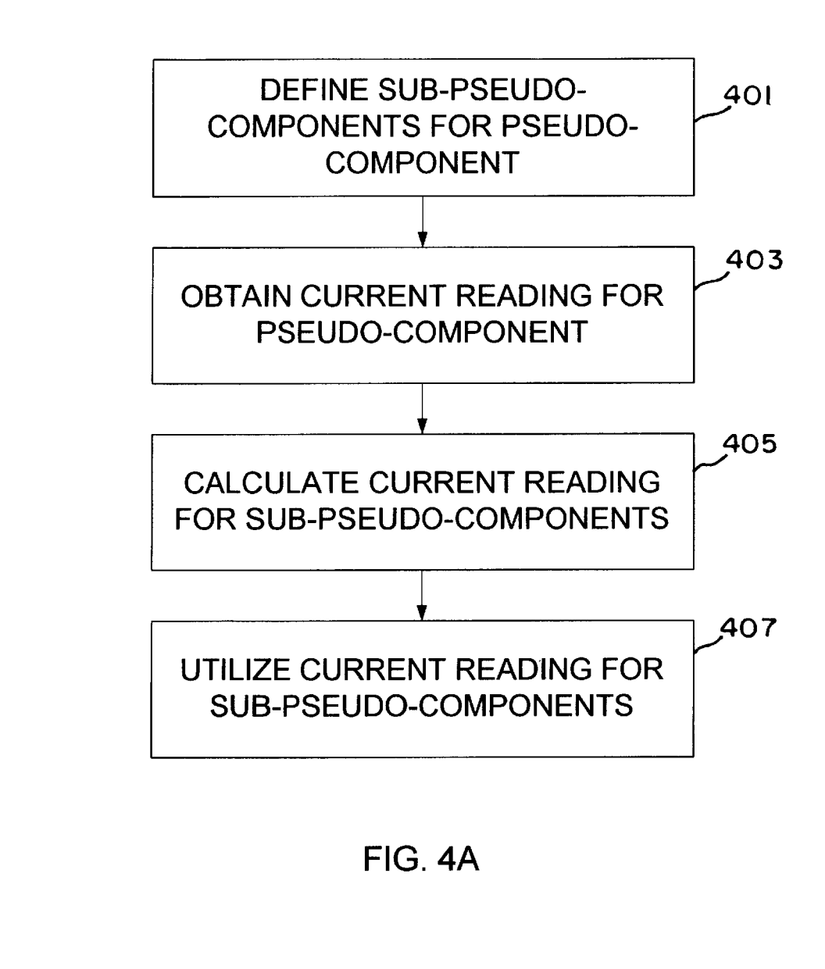
FIG. 4A is a flowchart showing the steps performed in connection with the component mapper of FIG. 2.
Figure 4B:
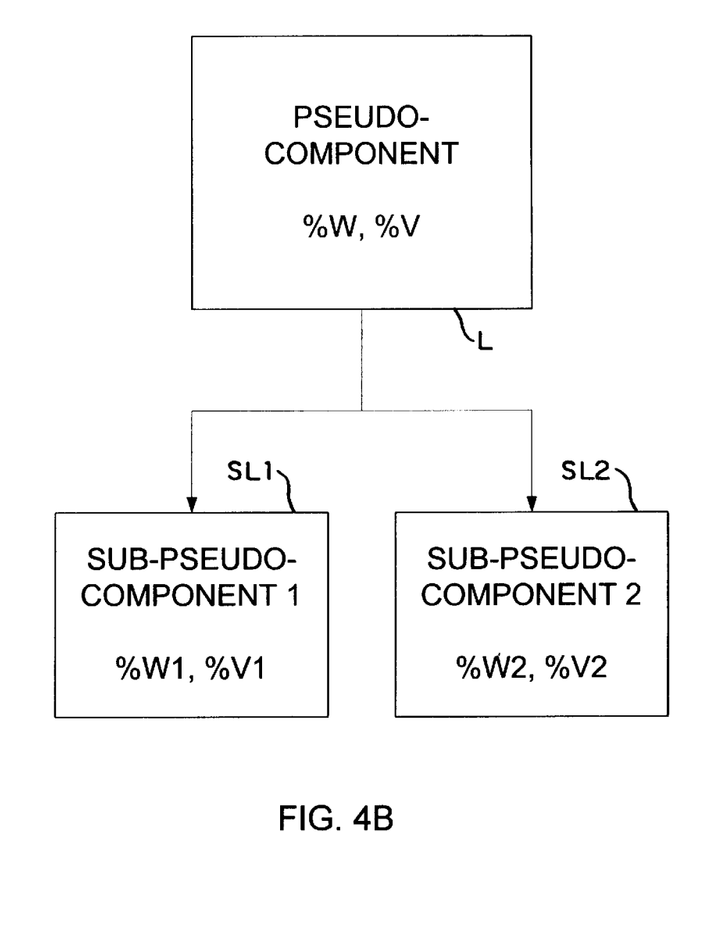
FIG. 4B is a block diagram showing the relationship between a pseudo-component and its sub-pseudo-components in connection with the component mapper of FIG. 2.

For each lump, then, the component mapper obtains a current density D, a current percentage weight % W, and a current percentage volume % V (step 403, FIG. 4A). With such information, the component mapper then calculates the sub-lump values % W1, % W2, % V1, and % V2 according to eqs. (1)–(4) (step 405, FIG. 4A). As should be understood, the component mapper 22 can employ any of a variety of specific measures to perform the aforementioned calculation without departing from the spirit and scope of the present invention. For example, the component mapper 22 can be supplied with eqs. (1)–(4) in the form disclosed above, and then perform appropriate calculations in a known manner. Of course, the component mapper 22 can also be supplied with eqs. (1)–(4) in a form solved to define each of the four un-known values according to known values, and then likewise perform appropriate calculations in a known manner.

Once the component mapper 22 has determined percentage weight and percentage volume values for all the sub-lumps of all the lumps, such values are then output from the component mapper 22 to be utilized in a real-time optimization process (step 407, FIG. 4A). In particular, the values output from the component mapper 22 are received by the fractionator model 14m, as is shown in FIG. 2. As should now be understood, the component mapper replaces the varying density lumps with the pre-defined density sub-lumps. As should also be understood, since the optimization process is an iterative process, and since each iteration may produce different data output from the reactor model 12m, the component mapper 22 repeatedly obtains current, updated input information from the reactor model 12m, performs the necessary calculations on such information, and produces current, updated output information for receipt by the fractionator model 14m.

Importantly, now that the fractionator model 14m can assume that the density of each of the sub-lumps is constant, the processing time for such fractionator model 14m is greatly reduced. Since the fractionator 14/fractionator model 14m should not alter the density of any sub-lump, the output of such fractionator model 14m will comprise pre-defined density sub-lumps. Accordingly, and also importantly, the distillation models 16m can assume that the density of each of the sub-lumps is constant, and the processing time for such distillation models 16m is also greatly reduced. Empirically, it has been found that the reductions in processing time achieved by employing pre-defined density sub-lumps are enough to qualify the modeling process embodied in the model 18a as a real-time optimization process. That is, with pre-defined density sub-lumps, processing time for the model 18a is now less than about 45 minutes.

Figure 5:
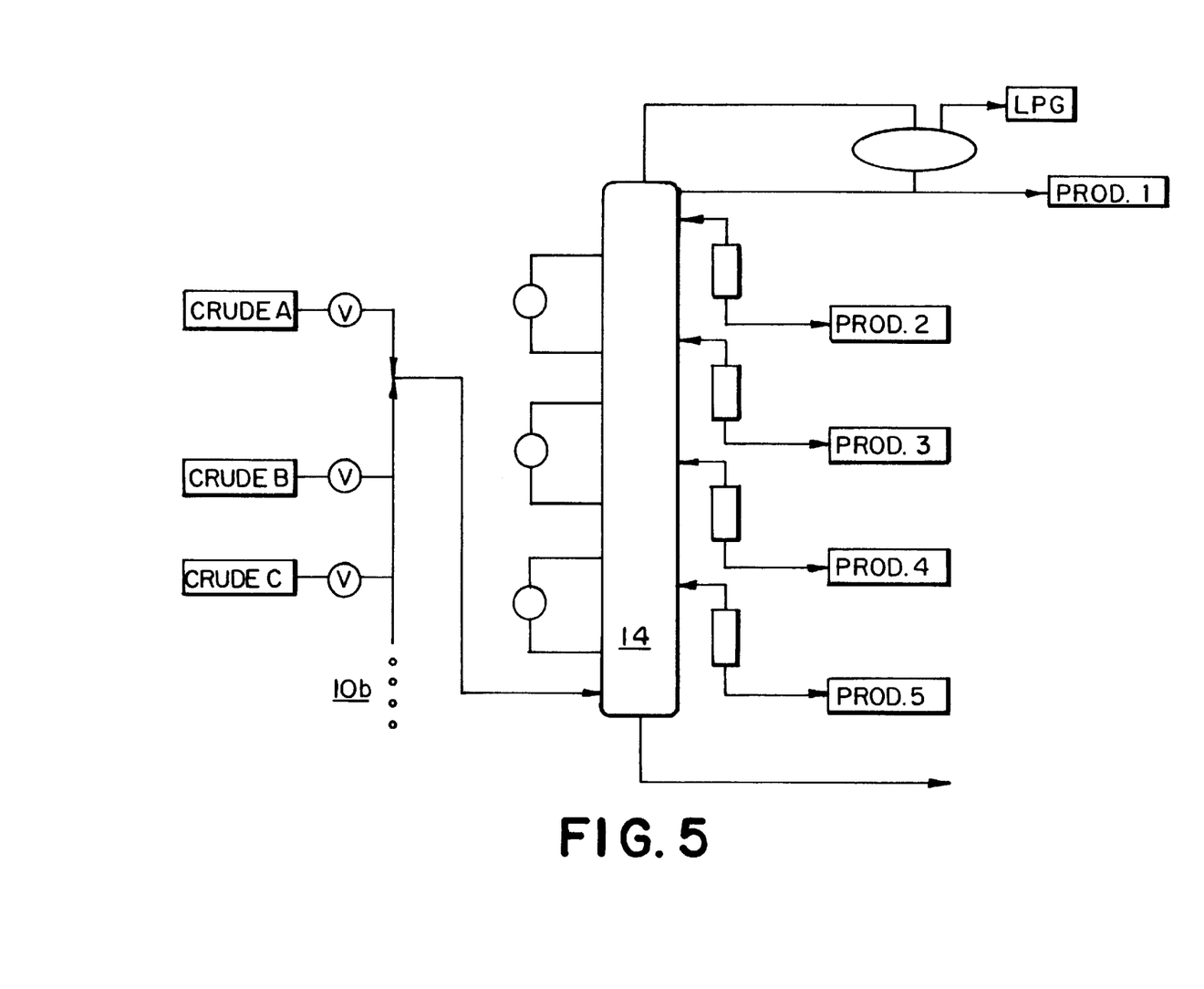
FIG. 5 is a block diagram showing another typical configuration of refinery units including a main crude unit or crude fractionator receiving one or more crudes as an input thereto.

Turning now to FIG. 5, another refinery system 10b is shown. As seen, the refinery system 10b can receive a plurality of feeds simultaneously, and such feeds are combined and directed to a fractionator 14. In one embodiment of the refinery system 10b, such system 10b is the main crude unit discussed briefly above. In such main crude unit, several distinct crude oil feed stocks can be simultaneously directed in pre-defined proportions or percentages to the fractionator 14 in a combined fluid stream. The fractionator 14 then initially fractionates the combined fluid stream to at least roughly separate such fluid stream into several fluid streams (PROD. 1–PROD. 5, etc.) for further processing or the like. The fractionator 14 in refinery system 10b is identical in operation to the fractionator 14 in refinery system 10a, although the outputs may differ. In another embodiment of the refinery system 10b, the fractionator 14 is any fractionator or distillation column that can receive several distinct fluid streams simultaneously directed thereto in pre-defined proportions or percentages in a combined fluid stream.

Figure 6:
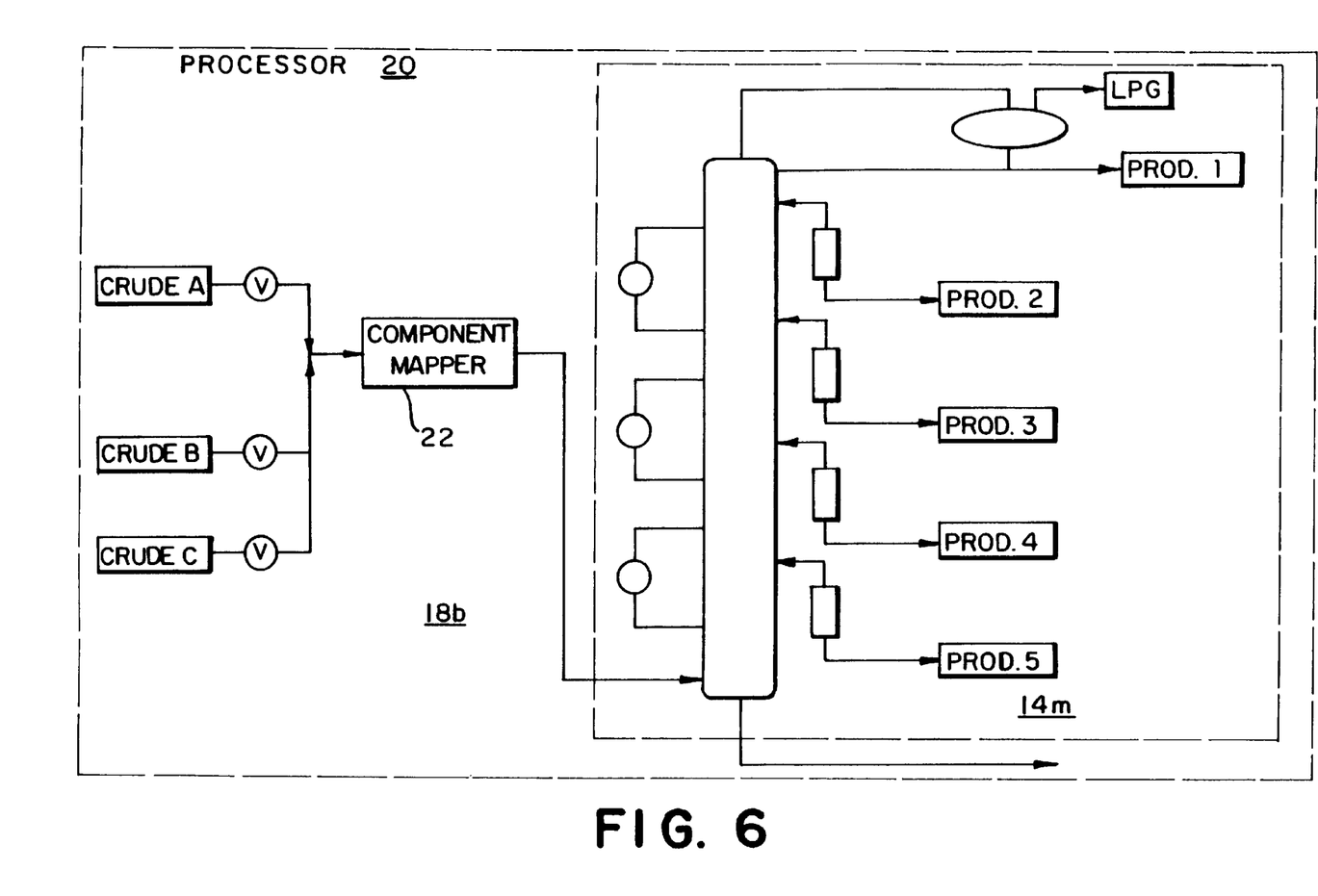
FIG. 6 is a block diagram in accordance with another embodiment of the present invention, and shows the main crude unit of FIG. 5 modeled along with the component mapper.

As with the refinery system 10a, and referring now to FIG. 6, it is seen that in performing an analysis on the refinery system 10b of FIG. 5, each element as shown in FIG. 5 is replaced by and represented by a corresponding computer model 18b operating on an appropriate computer system or processor 20. In this case, the model 18b includes the fractionator model 14m representative of the fractionator 14, plus an additional modeling construct to define the proportion or percentage of each individual fluid stream in the combined fluid stream received by the fractionator model 14m.

As before, optimization takes place with the model 18b. Here, however, the optimization process can vary or adjust the proportion or percentage of the several individual feeds (crude oils in FIGS. 5 and 6) as part of such optimization process. In this case, the combined fluid stream is modeled as a plurality of lumps, where each lump has a varying density. The lump density values are known based on obtained assay information for each individual fluid stream in the combined fluid stream, and also based on the proportion or percentage combination of all the individual fluid streams in the combined fluid stream.

The model 18b of the refinery system 10b has a component mapper 22 which is substantially identical to the component mapper 22 in the model 18a of the refinery system 10a. Accordingly, the component mapper 22 in the refinery system 10b operates based on pre-defined sub-lumps, each of which has a pre-defined density.

For each lump, then, the component mapper 22 in the refinery system 10b obtains a current density, a current percentage weight, and a current percentage volume (step 403, FIG. 4A). With such information, the component mapper then calculates a current percentage weight and a current percentage volume for each sub-lump of the lump (step 405, FIG. 4A).

Once the component mapper 22 in the refinery system 10b has determined percentage weight and percentage volume values for all the sub-lumps of all the lumps, such values are then output from the component mapper 22 to be utilized in a real-time optimization process (step 407, FIG. 4A). In particular, the sub-lump values output from the component mapper 22 are received by the fractionator model 14m, as is shown in FIG. 6. As before, the fractionator model 14m of the model 18b can assume that the density of each of the sub-lumps is constant, with the result being that the processing time for such fractionator model 14m is greatly reduced to the point where real-time optimization is achieved.

Although thus far described in terms of producing sub-lumps having pre-defined densities, the component mapper 22 of the present invention is not limited merely to such endeavor. Instead, the component mapper 22 may be employed, with appropriate modification, to producing sub-lumps having any kind of pre-defined property without departing from the spirit and scope of the present invention. For example, rather than adjusting percentage weight and percentage volume to achieve a pre-defined density, the component mapper 22 may adjust density and percentage weight to achieve a pre-defined percentage volume. In fact, the pre-defined property may be any appropriate physical property or chemical property, including but not limited to a cold property, an octane number, a chemical content, a chemical type, a viscosity, or the like. Of course, for the selected pre-defined property, the component mapper 22 must have a corresponding varying amount that can be adjusted to achieve a pre-defined value for the pre-defined property. Such varying amount may be a percentage value representative of a chemical or a physical property, and can include percentage weight, percentage volume, mole percentage, or the like.

In the present invention, a component mapper produces pre-defined density or other property sub-lumps from varying density or other property lumps. The details and mechanics of the programming necessary to effectuate the component mapper, the models, and other features have not been provided in any great specificity, owing to the fact that such details are already generally known or should now be apparent and should therefore be readily appreciated by those skilled in the art. Those skilled in the art should also appreciate that changes could be made to the embodiments described above without departing from the inventive concepts thereof. It is understood, therefore, that this invention is not limited to the particular embodiments disclosed, but instead it encompasses modifications within the spirit and scope of the present invention as defined by the appended claims.

What is claimed is:

1. A method in connection with a process wherein a fluid stream having multiple physical components is modeled as a plurality of pseudo-components, each physical component having a boiling point, each pseudo-component having a pre-defined boiling point and including all physical components from the fluid stream having approximately the pre-defined boiling point, each pseudo-component in the model of the fluid stream having a varying density, a varying percentage weight, and a varying percentage volume, the method comprising the steps of:

defining for each pseudo-component in the model of the fluid stream a plurality of sub-pseudo-components such that the pseudo-component is replaceable with the plurality of sub-pseudo-components, each sub-pseudo component having the pre-defined boiling point of the pseudo-component, a pre-defined density, a varying percentage weight, and a varying percentage volume;

for each pseudo-component:
obtaining a current density, a current percentage weight, and a current percentage volume of the pseudo-component; and
calculating a current percentage weight value and a current percentage volume value for each sub-pseudo-component of the pseudo-component; and utilizing the pre-defined density value, the calculated current percentage weight value, and the calculated current percentage volume value for each sub-pseudo-component of each pseudo-component in a real-time optimization process.

2. The method of claim 1 wherein the utilizing step comprises utilizing the pre-defined density value, the calculated current percentage weight value, and the calculated current percentage volume value for each sub-pseudo-component of each pseudo-component in a real-time optimization process which optimizes refining of the modeled fluid stream based on pre-selected optimization variables.

3. The method of claim 1 wherein the modeled fluid stream is forwarded to a fractionator or distillation column for fluid distillation, and wherein the utilizing step comprises utilizing the pre-defined density value, the calculated current percentage weight value, and the calculated current percentage volume value for each sub-pseudo-component of each pseudo-component in a real-time optimization process which includes modeling of the fractionator or distillation column based on the pre-defined density value, the calculated current percentage weight value, and the calculated current percentage volume value for each sub-pseudo-component of each pseudo-component.

4. The method of claim 1 further comprising the step of selecting the modeled fluid stream to be a varying output of a reactor.

5. The method of claim 1 further comprising the step of selecting the modeled fluid stream to be a varying combination of a plurality of distinct fluid streams.

6. The method of claim 5 wherein the step of selecting comprises selecting the modeled fluid stream to be a varying combination of a plurality of distinct crude oil feed stocks.

7. The method of claim 1 wherein the sum of the percentage weights of all of the sub-pseudo-components of each pseudo-component is substantially equal to the percentage weight of such pseudo-component, and wherein the sum of the percentage volumes of all of the sub-pseudo-components of each pseudo-component is substantially equal to the percentage volume of such pseudo-component.

8. The method of claim 1 wherein the obtaining and calculating steps are repeatedly performed to produce repeatedly updated current percentage weight values and current percentage volume values for each sub-pseudo-component of each pseudo-component, and wherein the utilizing step comprises utilizing the pre-defined density value, and the repeatedly updated current percentage weight values and current percentage volume values for each sub-pseudo-component of each pseudo-component in a real-time optimization process.

9. The method of claim 1 wherein the defining step comprises defining for each pseudo-component a pair of sub-pseudo-components.

10. The method of claim 9 wherein the defining step comprises defining for each pseudo-component a high sub-pseudo component having the pre-defined boiling point of the pseudo-component and a relatively high pre-defined density, and a low sub-pseudo component having the pre-defined boiling point of the pseudo-component and a relatively low pre-defined density.

11. The method of claim 10 wherein the defining step comprises defining for each pseudo-component a high sub-pseudo component having the pre-defined boiling point of the pseudo-component and a pre-defined high density determined as approximately the highest likely density of the pseudo-component, and a low sub-pseudo component having the pre-defined boiling point of the pseudo-component and a relatively low pre-defined density determined as approximately the lowest likely density of the pseudo-component.

12. The method of claim 9:
wherein the modeled fluid stream has a total density DT;
wherein each pseudo-component P in the model of the fluid stream has a varying density D, a varying percentage weight % W, and a varying percentage volume % V;

$$\text{wherein } D=DT*\%\ W/\%\ V; \qquad (1)$$

wherein each sub-pseudo component Px (x=1, 2) of each pseudo-component P has a pre-defined density Dx, a varying percentage weight % Wx, and a varying percentage volume % Vx;

$$\text{wherein } D1=DT*\%\ W1/\%\ V1; \qquad (2)$$

$$\text{wherein } D2=DT*\%\ W2/\%\ V2; \qquad (3)$$

$$\text{wherein } \%\ W=\%\ W1+\%\ W2 \qquad (4)$$

$$\text{wherein } \%\ V=\%\ V1+\%\ V2 \qquad (5)$$

wherein D1 and D2 are pre-defined;
wherein DT, % W, and % V are known; and
wherein the calculating step comprises solving equations (2)–(5) for % W1, % W2, % V1, and % V2.

13. A computer having a processor and memory in connection with a process wherein a fluid stream having multiple physical components is modeled as a plurality of pseudo-components, each physical component having a boiling point, each pseudo-component having a pre-defined boiling point and including all physical components from the fluid stream having approximately the pre-defined boiling point, each pseudo-component in the model of the fluid stream having a varying density, a varying percentage weight, and a varying percentage volume, the computer further having a mapper stored in the memory and running on the processor, the mapper defining for each pseudo-component in the model of the fluid stream a plurality of sub-pseudo-components such that the pseudo-component is replaceable with the plurality of sub-pseudo-components, each sub-pseudo component having the pre-defined boiling point of the pseudo-component, a pre-defined density, a varying percentage weight, and a varying percentage volume;

the mapper having an input for being supplied for each pseudo-component a current density, a current percentage weight, and a current percentage volume of the pseudo-component;

the mapper for calculating a current percentage weight value and a current percentage volume value for each sub-pseudo-component of each pseudo-component; and the mapper having an output for supplying the calculated current percentage weight value and the calculated current percentage volume value for each sub-pseudo-component of each pseudo-component, the calculated current percentage weight value, the calculated current percentage volume value, and the pre-defined density value for each sub-pseudo-component of each pseudo-component to be utilized in a real-time optimization process.

14. The computer of claim 13 wherein the real-time optimization process optimizes refining of the modeled fluid stream based on pre-selected optimization variables.

15. The computer of claim 13 wherein the modeled fluid stream is forwarded to a fractionator or distillation column for fluid distillation, and wherein the real-time optimization process includes modeling of the fractionator or distillation column based on the pre-defined density value, the calculated current percentage weight value, and the calculated current percentage volume value for each sub-pseudo-component of each pseudo-component.

16. The computer of claim 13 wherein the modeled fluid stream is a varying output of a reactor.

17. The computer of claim 13 wherein the modeled fluid stream is a varying combination of a plurality of distinct fluid streams.

18. The computer of claim 17 wherein the modeled fluid stream is a varying combination of a plurality of distinct crude oil feed stocks.

19. The computer of claim 18 wherein the sum of the percentage weights of all of the sub-pseudo-components of each pseudo-component is substantially equal to the percentage weight of such pseudo-component, and wherein the sum of the percentage volumes of all of the sub-pseudo-components of each pseudo-component is substantially equal to the percentage volume of such pseudo-component.

20. The computer of claim 13:

wherein the current density, the current percentage weight, and the current percentage volume for each pseudo-component are repeatedly supplied to the input of the mapper, wherein the mapper repeatedly updates the current percentage weight values and the current percentage volume values for each sub-pseudo-component of each pseudo-component, and wherein the repeatedly updated current percentage weight value, the repeatedly updated current percentage volume value, and the pre-defined density value for each sub-pseudo-component of each pseudo-component is utilized in a real-time optimization process.

21. The computer of claim 13 wherein the mapper defines for each pseudo-component a pair of sub-pseudo-components.

22. The computer of claim 21 wherein the mapper defines for each pseudo-component a high sub-pseudo component having the pre-defined boiling point of the pseudo-component and a relatively high pre-defined density, and a low sub-pseudo component having the pre-defined boiling point of the pseudo-component and a relatively low pre-defined density.

23. The computer of claim 22 wherein the mapper defines for each pseudo-component a high sub-pseudo component having the pre-defined boiling point of the pseudo-component and a pre-defined high density determined as approximately the highest likely density of the pseudo-component, and a low sub-pseudo component having the pre-defined boiling point of the pseudo-component and a relatively low pre-defined density determined as approximately the lowest likely density of the pseudo-component.

24. The computer of claim 21:

wherein the modeled fluid stream has a total density DT;

wherein each pseudo-component P in the model of the fluid stream has a varying density D, a varying percentage weight % W, and a varying percentage volume % V;

$$\text{wherein } D=DT*\% \ W/\% \ V; \tag{1}$$

wherein each sub-pseudo component Px (x=1, 2) of each pseudo-component P has a pre-defined density Dx, a varying percentage weight % Wx, and a varying percentage volume % Vx;

$$\text{wherein } D1=DT*\% \ W1/\% \ V1; \tag{2}$$

$$\text{wherein } D2=DT*\% \ W2/\% \ V2; \tag{3}$$

$$\text{wherein } \% \ W=\% \ W1+\% \ W2 \tag{4}$$

$$\text{wherein } \% \ V=\% \ V1+\% \ V2 \tag{5}$$

wherein D1 and D2 are pre-defined;

wherein DT, % W, and % V are known; and wherein the mapper solves equations (2)–(5) for % W1, % W2, % V1, and % V2.

25. A mapper in connection with a process wherein a fluid stream having multiple physical components is modeled as a plurality of pseudo-components, each physical component having a boiling point, each pseudo-component having a pre-defined boiling point and including all physical components from the fluid stream having approximately the pre-defined boiling point, each pseudo-component in the model of the fluid stream having a varying density, a varying percentage weight, and a varying percentage volume, the mapper defining for each pseudo-component in the model of the fluid stream a plurality of sub-pseudo-components such that the pseudo-component is replaceable with the plurality of sub-pseudo-components, each sub-pseudo component having the pre-defined boiling point of the pseudo-component, a pre-defined density, a varying percentage weight, and a varying percentage volume;

the mapper having an input for being supplied for each pseudo-component a current density, a current percentage weight, and a current percentage volume of the pseudo-component;

the mapper for calculating a current percentage weight value and a current percentage volume value for each sub-pseudo-component of each pseudo-component; and the mapper having an output for supplying the calculated current percentage weight value and the calculated current percentage volume value for each sub-pseudo-component of each pseudo-component, the calculated current percentage weight value, the calculated current percentage volume value, and the pre-defined density value for each sub-pseudo-component of each pseudo-component to be utilized in a real-time optimization process.

26. The mapper of claim 25 wherein the real-time optimization process optimizes refining of the modeled fluid stream based on pre-selected optimization variables.

27. The mapper of claim 25 wherein the modeled fluid stream is forwarded to a fractionator or distillation column for fluid distillation, and wherein the real-time optimization process includes modeling of the fractionator or distillation column based on the pre-defined density value, the calculated current percentage weight value, and the calculated current percentage volume value for each sub-pseudo-component of each pseudo-component.

28. The mapper of claim 25 wherein the modeled fluid stream is a varying output of a reactor.

29. The mapper of claim 25 wherein the modeled fluid stream is a varying combination of a plurality of distinct fluid streams.

30. The mapper of claim 29 wherein the modeled fluid stream is a varying combination of a plurality of distinct crude oil feed stocks.

31. The mapper of claim 25 wherein the sum of the percentage weights of all of the sub-pseudo-components of each pseudo-component is substantially equal to the percentage weight of such pseudo-component, and wherein the sum of the percentage volumes of all of the sub-pseudo-components of each pseudo-component is substantially equal to the percentage volume of such pseudo-component.

32. The mapper of claim 25:
wherein the current density, the current percentage weight, and the current percentage volume for each pseudo-component are repeatedly supplied to the input of the mapper,
wherein the mapper repeatedly updates the current percentage weight values and the current percentage volume values for each sub-pseudo-component of each pseudo-component, and
wherein the repeatedly updated current percentage weight value, the repeatedly updated current percentage volume value, and the pre-defined density value for each sub-pseudo-component of each pseudo-component is utilized in a real-time optimization process.

33. The mapper of claim 25 wherein the mapper defines for each pseudo-component a pair of sub-pseudo-components.

34. The mapper of claim 33 wherein the mapper defines for each pseudo-component a high sub-pseudo component having the pre-defined boiling point of the pseudo-component and a relatively high pre-defined density, and a low sub-pseudo component having the pre-defined boiling point of the pseudo-component and a relatively low pre-defined density.

35. The mapper of claim 34 wherein the mapper defines for each pseudo-component a high sub-pseudo component having the pre-defined boiling point of the pseudo-component and a pre-defined high density determined as approximately the highest likely density of the pseudo-component, and a low sub-pseudo component having the pre-defined boiling point of the pseudo-component and a relatively low pre-defined density determined as approximately the lowest likely density of the pseudo-component.

36. The mapper of claim 33:
wherein the modeled fluid stream has a total density DT;
wherein each pseudo-component P in the model of the fluid stream has a varying density D, a varying percentage weight % W, and a varying percentage volume % V;

$$\text{wherein } D = DT * \% W / \% V; \tag{1}$$

wherein each sub-pseudo component Px (x=1, 2) of each pseudo-component P has a pre-defined density Dx, a varying percentage weight % Wx, and a varying percentage volume % Vx;

$$\text{wherein } D1 = DT * \% W1 / \% V1; \tag{2}$$

$$\text{wherein } D2 = DT * \% W2 / \% V2; \tag{3}$$

$$\text{wherein } \% W = \% W1 + \% W2 \tag{4}$$

$$\text{wherein } \% V = \% V1 + \% V2 \tag{5}$$

wherein D1 and D2 are pre-defined;
wherein DT, % W, and % V are known; and
wherein the mapper solves equations (2)–(5) for % W1, % W2, % V1, and % V2.

37. A modeling system for modeling a fluid stream having multiple physical components, each physical component having a boiling point, the modeling system comprising:
a fluid stream model modeling the fluid stream as a plurality of pseudo-components, each pseudo-component having a pre-defined boiling point and including all physical components from the fluid stream having approximately the pre-defined boiling point, each pseudo-component in the model of the fluid stream having a varying density, a varying percentage weight, and a varying percentage volume; and
a mapper defining for each pseudo-component in the fluid stream model a plurality of sub-pseudo-components such that the pseudo-component is replaceable with the plurality of sub-pseudo-components, each sub-pseudo component having the pre-defined boiling point of the pseudo-component, a pre-defined density, a varying percentage weight, and a varying percentage volume;
the mapper having an input coupled to the fluid stream model for being supplied for each pseudo-component a current density, a current percentage weight, and a current percentage volume of the pseudo-component;
the mapper for calculating a current percentage weight value and a current percentage volume value for each sub-pseudo-component of each pseudo-component; and
the mapper having an output for supplying the calculated current percentage weight value and the calculated current percentage volume value for each sub-pseudo-component of each pseudo-component,
the calculated current percentage weight value, the calculated current percentage volume value, and the pre-defined density value for each sub-pseudo-component of each pseudo-component to be utilized in a real-time optimization process.

38. The modeling system of claim 37 wherein the real-time optimization process optimizes refining of the modeled fluid stream based on pre-selected optimization variables.

39. The modeling system of claim 37 wherein the modeled fluid stream is forwarded to a fractionator or distillation column for fluid distillation, and wherein the real-time optimization process includes modeling of the fractionator or distillation column based on the pre-defined density value, the calculated current percentage weight value, and the calculated current percentage volume value for each sub-pseudo-component of each pseudo-component.

40. The modeling system of claim 37 wherein the modeled fluid stream is a varying output of a reactor.

41. The modeling system of claim 37 wherein the modeled fluid stream is a varying combination of a plurality of distinct fluid streams.

42. The modeling system of claim 41 wherein the modeled fluid stream is a varying combination of a plurality of distinct crude oil feed stocks.

43. The modeling system of claim 37 wherein the sum of the percentage weights of all of the sub-pseudo-components of each pseudo-component is substantially equal to the percentage weight of such pseudo-component, and wherein the sum of the percentage volumes of all of the sub-pseudo-components of each pseudo-component is substantially equal to the percentage volume of such pseudo-component.

44. The modeling system of claim 31:

wherein the current density, the current percentage weight, and the current percentage volume for each pseudo-component are repeatedly supplied by the fluid stream model to the input of the mapper, wherein the mapper repeatedly updates the current percentage weight values and the current percentage volume values for each sub-pseudo-component of each pseudo-component, and wherein the repeatedly updated current percentage weight value, the repeatedly updated current percentage volume value, and the pre-defined density value for each sub-pseudo-component of each pseudo-component is utilized in a real-time optimization process.

45. The modeling system of claim 37 wherein the mapper defines for each pseudo-component a pair of sub-pseudo-components.

46. The modeling system of claim 45 wherein the mapper defines for each pseudo-component a high sub-pseudo component having the pre-defined boiling point of the pseudo-component and a relatively high pre-defined density, and a low sub-psuedo component having the pre-defined boiling point of the pseudo-component and a relatively low pre-defined density.

47. The modeling system of claim 46 wherein the mapper defines for each pseudo-component a high sub-pseudo component having the pre-defined boiling point of the pseudo-component and a pre-defined high density determined as approximately the highest likely density of the pseudo-component, and a low sub-pseudo component having the pre-defined boiling point of the pseudo-component and a relatively low pre-defined density determined as approximately the lowest likely density of the pseudo-component.

48. The modeling system of claim 45:

wherein the modeled fluid stream has a total density DT;

wherein each pseudo-component P in the model of the fluid stream has a varying density D, a varying percentage weight % W, and a varying percentage volume % V;

$$\text{wherein } D=DT*\% \ W/\% \ V; \tag{1}$$

wherein each sub-pseudo component Px (x 1, 2) of each pseudo-component P has a pre-defined density Dx, a varying percentage weight % Wx, and a varying percentage volume % Vx;

$$\text{wherein } D1=DT*\% \ W1/\% \ V1; \tag{2}$$

$$\text{wherein } D2=DT*\% \ W2/\% \ V2; \tag{3}$$

$$\text{wherein } \% \ W=\% \ W1+\% \ W2 \tag{4}$$

$$\text{wherein } \% \ V=\% \ V1+\% \ V2 \tag{5}$$

wherein D1 and D2 are pre-defined;

wherein DT, % W, and % V are known; and wherein the mapper solves equations (2)–(5) for % W1, % W2, % V1, and % V2.

* * * * *